United States Patent
Liu et al.

(10) Patent No.: US 12,499,596 B2
(45) Date of Patent: Dec. 16, 2025

(54) CT-FREE ATTENUATION CORRECTION FOR SPECT USING DEEP LEARNING WITH IMAGING AND NON-IMAGING INFORMATION

(71) Applicant: YALE UNIVERSITY, New Haven, CT (US)

(72) Inventors: Chi Liu, Orange, CT (US); Bo Zhou, New Haven, CT (US); Xiongchao Chen, New Haven, CT (US)

(73) Assignee: Yale University, New Haven, CT (US)

( * ) Notice: Subject to any disclaimer, the term of this patent is extended or adjusted under 35 U.S.C. 154(b) by 409 days.

(21) Appl. No.: 18/005,323

(22) PCT Filed: Jul. 14, 2021

(86) PCT No.: PCT/US2021/041601
§ 371 (c)(1),
(2) Date: Jan. 12, 2023

(87) PCT Pub. No.: WO2022/015834
PCT Pub. Date: Jan. 20, 2022

(65) Prior Publication Data
US 2023/0342999 A1      Oct. 26, 2023

Related U.S. Application Data

(60) Provisional application No. 63/051,685, filed on Jul. 14, 2020.

(51) Int. Cl.
*G06T 11/00* (2006.01)
(52) U.S. Cl.
CPC ................... *G06T 11/008* (2013.01)
(58) Field of Classification Search
CPC ....... G06T 11/008; G06T 11/003; G06N 3/02; G06N 20/00; A61B 6/4258; A61B 6/032; A61B 6/037; A61B 6/02
See application file for complete search history.

(56) References Cited

U.S. PATENT DOCUMENTS 6,740,883 B1    5/2004   Stodilka et al.
11,335,040 B2 *  5/2022   Ding .................. G06T 11/005
(Continued)

FOREIGN PATENT DOCUMENTS

WO    2020214911 A1    10/2020

OTHER PUBLICATIONS

Whiteley, W., Panin, V.Y., Zhou, C., Cabello, J.A., Bharkhada, D., & Gregor, J. (2020). FastPET: Near Real-Time PET Reconstruction from Histo-Images Using a Neural Network. ArXiv, abs/2002.04665. (Year: 2020).*

(Continued)

*Primary Examiner* — Utpal D Shah
*Assistant Examiner* — Jack Peter Kraynak
(74) *Attorney, Agent, or Firm* — Welsh Flaxman & Gitler LLP (57) ABSTRACT

A system based upon artificial neural networks generates attenuation-corrected SPECT from non-attenuation-corrected SPECT (single photon emission computed tomography) without or with an intermediate step of attenuation map estimation. The system includes a SPECT scanner with CZT cameras for dynamic SPECT imaging. The system also includes a machine learning system including a 3D Dual Squeeze-and-Excitation Residual Dense Network for generating attenuation-corrected SPECT or attenuation maps from non-attenuation-corrected SPECT. The machine learning system reconstructs images from photopeak window and one or more scatter windows of the SPECT scanner are fed to the 3D Dual Squeeze-and-Excitation Residual Dense Network to generate attenuation-corrected SPECT or attenuation maps.

22 Claims, 8 Drawing Sheets

(56) References Cited

U.S. PATENT DOCUMENTS

2013/0267841 A1 10/2013 Vija
2015/0098640 A1 4/2015 Berker et al.
2020/0258272 A1* 8/2020 Ding .................... G06N 3/08

OTHER PUBLICATIONS

J. Yang, D. Park, G. T. Gullberg and Y. Seo, "Joint correction of attenuation and scatter in image space using deep convolutional neural networks for dedicated brain 18 F-FDG PET", Phys. Med. Biol., vol. 64, No. 7, 2019. (Year: 2019).*

Luyao Shi, John Onofrey, Hui Liu, Yi-Hwa Liu, Chi Liu, Generating Attenuation Map for SPECT-only systems using Generative Adversarial Networks Journal of Nuclear Medicine May 2019, 60 (supplement 1) 572; (Year: 2019).*

Li, Y., & Fan, Y. (Apr. 2020). DeepSEED: 3D squeeze-and-excitation encoder-decoder convolutional neural networks for pulmonary nodule detection. In 2020 IEEE 17th International Symposium on Biomedical Imaging (ISBI) (pp. 1866-1869). IEEE. (Year: 2020).*

Zhu, W., Liu, C., Fan, W., & Xie, X. (2018). DeepLung: Deep 3D Dual Path Nets for Automated Pulmonary Nodule Detection and Classification. 2018 IEEE Winter Conference on Applications of Computer Vision (WACV), 673-681. (Year: 2018).*

Shi et al. Generating Attenuation Map for SPECT-only systems using Generative Adversarial 1-44 Networks. The Journal of Nuclear Medicine. May 31, 2019; URL: https://jnm.snmjournals.org/content/60/supplement_1/572.

Li et al. DeepSEED: 3D Squeeze-and-Excitation Encoder-Decoder Convolutional Neural 1-44 Networks for Pulmonary Nodule Detection. May 22, 2020. URL: https://ieeexplore.ieee.org/document/9098317; pp. 1866-1869.

* cited by examiner

Visualization of attenuation correction in horizontal long axis (1st row), vertical long axis (2nd row), and short axis (3rd row). NC image volume (1st column) is converted to AC volume (3rd - 5th columns) using different network and input settings. The corresponding AC ground truth is shown on the 2nd column.

FIG. 3

Visualizations of polar maps. Our DuRDN analysis generated the best quality polar map in terms of the region similarity.

CT-FREE ATTENUATION CORRECTION FOR SPECT USING DEEP LEARNING WITH IMAGING AND NON-IMAGING INFORMATION

CROSS REFERENCE TO RELATED APPLICATIONS

This application is a National Stage of PCT/US2021/041601, entitled "CT-FREE ATTENUATION CORRECTION FOR SPECT USING DEEP LEARNING WITH IMAGING AND NON-IMAGING INFORMATION," filed Jul. 14, 2021, which claims the benefit of U.S. Provisional Patent Application Ser. No. 63/051,685, entitled "CT-FREE ATTENUATION CORRECTION FOR SPECT USING DEEP LEARNING WITH IMAGING AND NON-IMAGING INFORMATION," filed Jul. 14, 2020, both of which are incorporated herein by reference.

This invention was made with government support under R01HL123949 and R01HL154345 awarded by National Institutes of Health. The government has certain rights in the invention.

BACKGROUND OF THE INVENTION

1 Field of the Invention

The invention relates to attenuation correction for single photon emission computed tomography (SPECT) through the application of deep learning networks incorporating images from scatter window(s) and individual subject's information such as BMI (body mass index) and gender.

2. Description of the Related Art

Single photon emission computed tomography (SPECT) is a non-invasive imaging procedure that provides radiotracer distribution images of the patient body by detecting gamma-ray photons. SPECT plays an important role in the clinical diagnosis of cardiovascular, oncological, and neurological disease. In order to perform qualitative, quantitative, or semi-quantitative analysis for SPECT, accurate attenuation correction is essential.

SPECT continues to play a critical role in the diagnosis and management of coronary artery disease (CAD). While conventional SPECT scanners using parallel-hole collimators are still the foundation of cardiac SPECT, dedicated cardiac SPECT scanners have also been developed. Such dedicated scanners, such as the GE Alcyone 530/570c systems and the D-SPECT™ systems (that is, a medical imaging apparatus featuring nuclear imaging, namely, SPECT imaging as manufactured by Spectrum Dynamics Medical Limited Company), both with CZT (Cadmium Zinc Telluride) detectors, typically have multiple detectors collecting photons emitted from the heart simultaneously. This leads to dramatically improved sensitivity (for example, 2 to 5 times). In addition, the GE Alcyone 530/570c systems use pinhole collimators and can achieve much higher resolution.

These dedicated scanners have opened doors to new applications with significant clinical impact, including, but not limited to, ultra-low-dose imaging, absolute quantification of myocardial blood flow (MBF) and coronary flow reserve (CFR), high resolution molecular imaging, multi-isotope imaging, and motion correction. Most of these new applications are uniquely achievable only using dedicated scanners.

However, an artifact-free reconstruction of radiotracer distribution and absolute activity for SPECT can only be obtained with the assistance of accurate correction of photon attenuation using an individualized attenuation map [Quantitative analysis in nuclear medicine imaging. Springer (2006)]. Therefore, in current clinical practice, computed tomography (CT) is utilized to generate the attenuation map [Pan, T. S., King, M. A., Luo, D. S., Dahlberg, S. T., Villegas, B. J.: Estimation of attenuation maps from scatter and photopeak window single photon-emission computed tomographic images of technetium 99m-labeled sestamibi. Journal of Nuclear Cardiology 4(1) (1997) 42-51; Zaidi, H., Hasegawa, B.: Determination of the attenuation map in emission tomography. Journal of Nuclear Medicine 44(2) (2003) 291-315; Pan, T. S., King, M. A., De Vries, D. J., Ljungberg, M.: Segmentation of the body and lungs from compton scatter and photopeak window data in spect: a monte-carlo investigation. IEEE transactions on medical imaging 15(1) (1996) 13-24]. However, notably, about 80% of SPECT scanners are stand-alone scanners and images are reconstructed without CT transmission scanning.

There are two additional limitations even when the CT is available. First, the use of adjunctive CT scanning for SPECT attenuation introduces additional radiation to patients along with increasing imaging system cost. Secondly, the misalignment between CT and SPECT due to motion can cause attenuation correction artifacts leading to inaccurate assessment of regional myocardial activity [Schäfers, K. P., Stegger, L.: Combined imaging of molecular function and morphology with pet/ct and spect/ct: image fusion and motion correction. Basic research in cardiology 103(2) (2008) 191-199; McQuaid, S. J., Hutton, B. F.: Sources of attenuation-correction artefacts in cardiac pet/ct and spect/ct. European journal of nuclear medicine and molecular imaging 35(6) (2008) 1117-1123]. Previous works have attempted to estimate the attenuation map directly from SPECT emission data [Jha, A. K., Zhu, Y., Clarkson, E., Kupinski, M. A., Frey, E. C.: Fisher information analysis of list-mode spect emission data for joint estimation of activity and attenuation distribution. arXiv preprint arXiv:1807.01767 (2018); Cade, S. C., Arridge, S., Evans, M. J., Hutton, B. F.: Use of measured scatter data for the attenuation correction of single photon emission tomography without trans-mission scanning. Medical physics 40(8) (2013) 082506]. Unfortunately, attenuation map estimation from these methods involving iterative optimization is time-consuming, and often contain high noise level when image activity is relatively low, which can result in SPECT reconstruction errors.

Recently, a deep-learning-based approach has been developed to generate the attenuation map for SPECT images using the reconstructed images from both primary and scatter (SC) windows [Shi, L., Onofrey, J., Liu, H, Liu, Y. H., Liu, C.: Deep learning-based attenuation map generation for myocardial perfusion SPECT. Eur J Nucl Med Mol Imaging. 2020 Mar. 26]. This approach generates attenuation maps that can be incorporated into image reconstruction for attenuation correction. Another approach for deep-learning-based attenuation correction is to bypass the step of attenuation map generation, by directly producing images with attenuation correction from images without attenuation correction [Yang, J., Shi, L., Wang, R., Miller, E J., Sinusas, A J., Liu, C., Gullberg, G T., Seo, Y.: Direct Attenuation Correction Using Deep Learning for Cardiac SPECT: A Feasibility Study. J Nucl Med. Feb. 2021]. Such approaches are particularly useful for dedicated small-organ (e.g. cardiac) SPECT scanners with a small field-of-view, such as the GE 530 system with pinhole collimators, where the reconstructed SPECT images do not fully cover the entire human body. Therefore, the approach for generating an attenuation map is not easily applicable to such dedicated SPECT systems.

Previously, U-Net [Çiçik Ö., Abdulkadir, A., Lienkamp, S. S., Brox, T., Ronneberger, O.: 3d u-net: learning dense volumetric segmentation from sparse annotation. International conference on medical image computing and computer-assisted intervention, Springer (2016) 424-432; Ronneberger, O., Fischer, P., Brox, T.: U-net: Convolutional networks for biomedical image segmentation. In: International Conference on Medical image computing and computer-assisted intervention, Springer (2015) 234-24110] has been extensively utilized in different medical image translation and correction tasks. However, there is limited exploration of incorporating patient-specific physiological information that is potentially useful in these tasks. With additional information concatenated channel-wise as input, efficient strategy for encoding and learning channel-wise pattern is also under-explored.

In recent years, deep-learning-based approaches have been proposed to estimate images of one modality from another [Nie, D., Trullo, R., Lian, J., Wang, L., et al.: Medical image synthesis with deep convolutional adversarial networks, IEEE Transactions on Biomedical Engineering 65, 2720-2730 (2018); Hwang, D., Kang, S. K., Kim, K. Y., Seo, S., et al.: Generation of PET attenuation map for whole-body time-of-flight 18F-FDG PET/MRI using a deep neural network trained with simultaneously reconstructed activity and attenuation maps, Journal of Nuclear Medicine jnumed, 118.219493 (2019); Han, X.: MR-based synthetic CT generation using a deep convolutional neural network method, Medical physics 44, 1408-1419 (2017)]. Particularly, initial success was obtained for the task of generating attenuation maps from nuclear images. In "MR-based synthetic CT generation using a deep convolutional neural network method," convolutional neural networks were used to convert magnetic resonance imaging (MRI) images to attenuation CT images for PET/MRI systems. In "Generation of PET attenuation map for whole-body time-of-flight 18F-FDG PET/MRI using a deep neural network trained with simultaneously reconstructed activity and attenuation maps," Hwang et al. proposed to predict the CT-attenuation maps from PET data alone.

SUMMARY

In one aspect a system based upon artificial neural networks to directly generate attenuation-corrected SPECT from non-attenuation-corrected SPECT (single photon emission computed tomography) without any intermediate step of attenuation map estimation is provided. The system includes a SPECT scanner for dynamic SPECT imaging. The system also includes a machine learning system including a 3D Dual Squeeze-and-Excitation Residual Dense Network for directly generating attenuation-corrected SPECT from non-attenuation-corrected SPECT without any intermediate step of attenuation map estimation, wherein the machine learning system reconstructs images from photopeak window and one or more scatter windows of the SPECT scanner are fed to the 3D Dual Squeeze-and-Excitation Residual Dense Network to generate attenuation-corrected SPECT.

In some embodiments 126 keV-155 keV is used for the photopeak window.

In some embodiments 55-80 keV, 80-105 keV, and 105-130 keV are used for the scatter windows.

In some embodiments the 3D Dual Squeeze-and-Excitation Residual Dense Network includes 3D Dual Residual Dense Blocks.

In some embodiments each 3D Dual Residual Dense Block consists of a Residual Dense Block and a 3D Dual Squeeze-and-Excitation Block.

In some embodiments the 3D Dual Squeeze-and-Excitation Block consists of two squeeze-and-excitation branches.

In some embodiments the squeeze-and-excitation branches include a spatial-squeeze-and-channel-excitation for re-calibrating feature channels and a channel-squeeze-and-spatial-excitation for recalibrating spatial features.

In some embodiments the Residual Dense Block ensures that each convolutional layer in the Residual Dense Block has access to all the subsequent layers and passes on information that needs to be preserved.

In some embodiments the Residual Dense Block includes multiple convolutional layers with Rectified Linear Units and a local feature fusion.

In some embodiments the 3D Dual Squeeze-and-Excitation Residual Dense Network consists of a Residual Dense Block, a Dual Squeeze-and-Excitation block, and a U-Net backbone architecture supported by the Residual Dense Block and the 3D Dual Squeeze-and-Excitation Block.

In another aspect a method based upon artificial neural networks to directly generate attenuation-corrected SPECT from non-attenuation-corrected SPECT (single photon emission computed tomography) without any intermediate step of attenuation map estimation is provided. The method includes generating images from a photopeak window and one or more scatter windows of a SPECT scanner with CZT cameras and applying a machine learning system including a 3D Dual Squeeze-and-Excitation Residual Dense Network for directly generating attenuation-corrected SPECT from non-attenuation-corrected SPECT without any intermediate step of attenuation map estimation. The machine learning system reconstructs the images from the photopeak window and the one or more scatter windows of the SPECT scanner to generate attenuation-corrected SPECT.

In another aspect, the system upon artificial neural networks also estimates truncated or full attenuation maps from SPECT reconstructions in a photopeak window and one or more scatter windows of the SPECT scanners. The estimated truncated or full attenuation maps are then incorporated into iterative reconstruction to generate attenuation-corrected SPECT images.

In another aspect, a method based upon artificial neural networks to estimate truncated or full attenuation maps is provided. The method includes applying a machine learning system including a 3D Dual Squeeze-and-Excitation Residual Dense Network for generating truncated or full attenuation maps from non-attenuation-corrected SPECT of SPECT scanners with CZT cameras. The machine learning system generates truncated or full attenuation maps from the photopeak window and the one or more scatter windows of the SPECT scanner. The estimated truncated or full attenuation maps are then incorporated into the image reconstruction process to generate the attenuation-corrected SPECT images.

BRIEF DESCRIPTION OF THE DRAWINGS

FIG. 1 is a schematic of the present system showing the workflow thereof. The NC (non-attenuation-corrected)

images, gender, BMI, and scatter windows are input into the deep learning model to generate the AC (attenuation-corrected) images.

DESCRIPTION OF THE EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring now to the various drawings, a method and system 100 is disclosed that employs a machine learning system based upon artificial neural networks to directly generate attenuation-corrected (AC) SPECT from non-attenuation-corrected (NC) SPECT without any intermediate step of attenuation map estimation, wherein the machine learning system includes a 3D Dual Squeeze-and-Excitation Residual Dense Network (DuRDN) 10.

As will be appreciated based upon the following disclosure, the present method and system provides improved imaging techniques for use in conjunction with SPECT scanners 20 to further improve the clinical efficacy of such scanning systems in a variety of significant ways. In accordance with a disclosed embodiment, SPECT scanners with CZT cameras 20, uniquely capable for dynamic SPECT imaging, are used in conjunction with the disclosed method and system. Such SPECT scanners are disclosed, for example, in U.S. Pat. No. 7,968,851, entitled "DYNAMIC SPECT CAMERA," and U.S. Pat. No. 9,625,310, entitled "SYSTEMS AND METHODS FOR SORTING AND SUMMING SIGNALS FROM AN IMAGING DETECTOR," both of which are incorporated herein by reference. Such scanners commonly do not have integrated CT, and image quantification with attenuation correction (AC) is challenging. Further still, artifacts are routinely encountered in daily clinical practice. The present invention provides a method and system 100 for improving image quality with these scanners.

As those skilled in the art will certainly appreciate, SPECT is a non-invasive imaging procedure that provides radiotracer distribution images of a patient's body by detecting gamma photons. SPECT plays an important role in the clinical diagnosis of cardiovascular, oncological, and neurological disease. In order to perform qualitative, quantitative, or semi-quantitative analysis for SPECT, accurate attenuation correction is essential. As mentioned above, dedicated SPECT scanners have been developed for imaging smaller organs, such as the heart.

The present method and system 100 use a deep learning-based model for directly generating attenuation-corrected (AC) SPECT 22 from non-attenuation-corrected (NC) SPECT 24 without any intermediate step of attenuation map estimation. As demonstrated below, qualitative and quantitative analysis demonstrate that the present method and system 100 are capable of generating accurate attenuation-corrected (AC) SPECT 22 from non-attenuation-corrected (NC) SPECT 24. Evaluations on real human data shows that the present method and system 100 produce attenuation-corrected (AC) SPECT that are consistent with CT-based attenuation-corrected SPECT.

The present method and system 100 apply various deep learning methods and investigative approaches implemented via computer-based image and/or data systems to improve resolution and quantitative accuracy. The present method and system 100 further provide for development and validation methods for dynamic SPECT imaging, particularly involving direct parametric image reconstruction. Further still, the present method and system 100 provide for development and validation methods for dual-isotope SPECT. Monte Carlo simulation and deep-learning-based methods are contemplated for development for tracers with different spatial distributions and fast kinetics.

As will be appreciated based upon the following disclosure, the present method and system 100 addresses the limitations of the prior art by directly generating attenuation-corrected (AC) SPECT 22 from non-attenuation-corrected (NC) SPECT 24 without any intermediate step of attenuation map estimation, namely CT-free attenuation corrected cardiac SPECT reconstruction.

Figure 1:
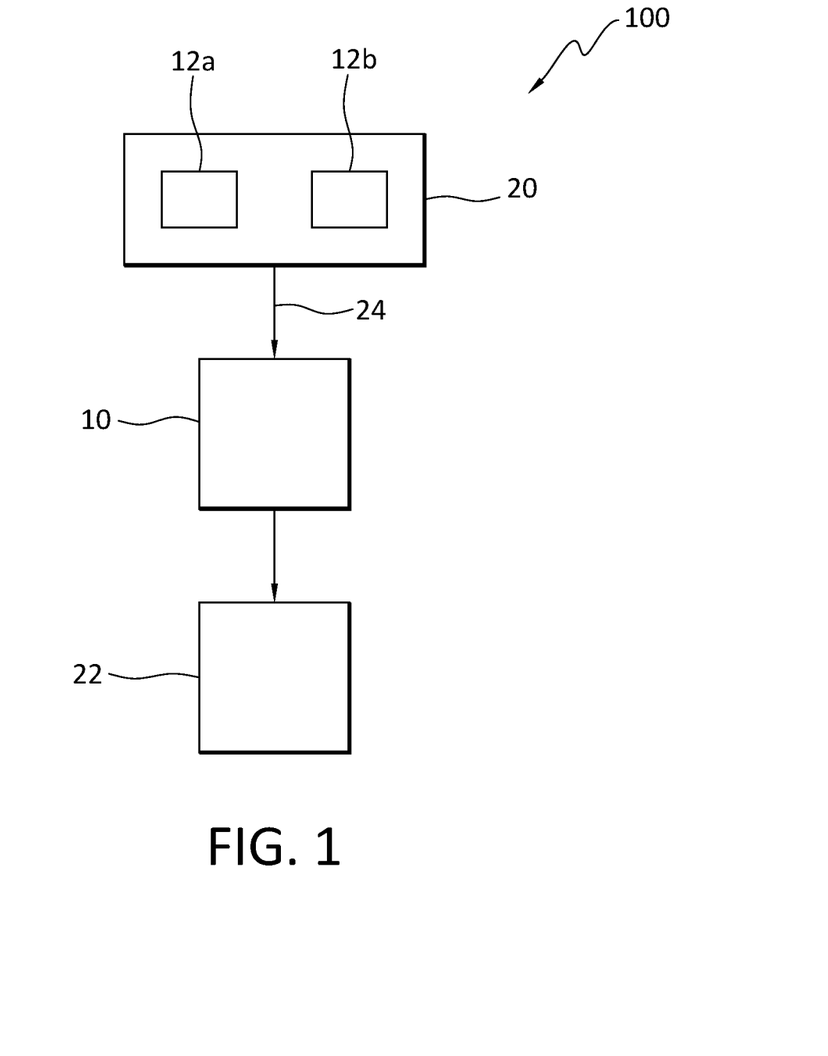

Referring to FIG. 1, a system 100 in accordance with the present invention is disclosed that employs a machine learning system based upon artificial neural networks to directly generate attenuation-corrected (AC) SPECT 22 from non-attenuation-corrected (NC) SPECT 24 without any intermediate step of attenuation map estimation, wherein the machine learning system includes a 3D Dual Squeeze-and-Excitation Residual Dense Network (DuRDN) 10. In accordance with the present method and system, images 12a, 12b reconstructed from photopeak window (that is, the primary window) and one or more scatter windows of the SPECT scanner 20 are fed to the DuRDN 10 to generate attenuation-corrected (AC) SPECT. Specifically, a primary SPECT image 12a and a scatter SPECT image 12b are fed into the DuRDN 10. While 126 keV-155 keV is used for photopeak window and 55-80 keV, 80-105 keV, and 105-130 keV are used for scatter windows in accordance with a disclosed embodiment, other energy window number ranges could also produce satisfactory results.

Figure 2:
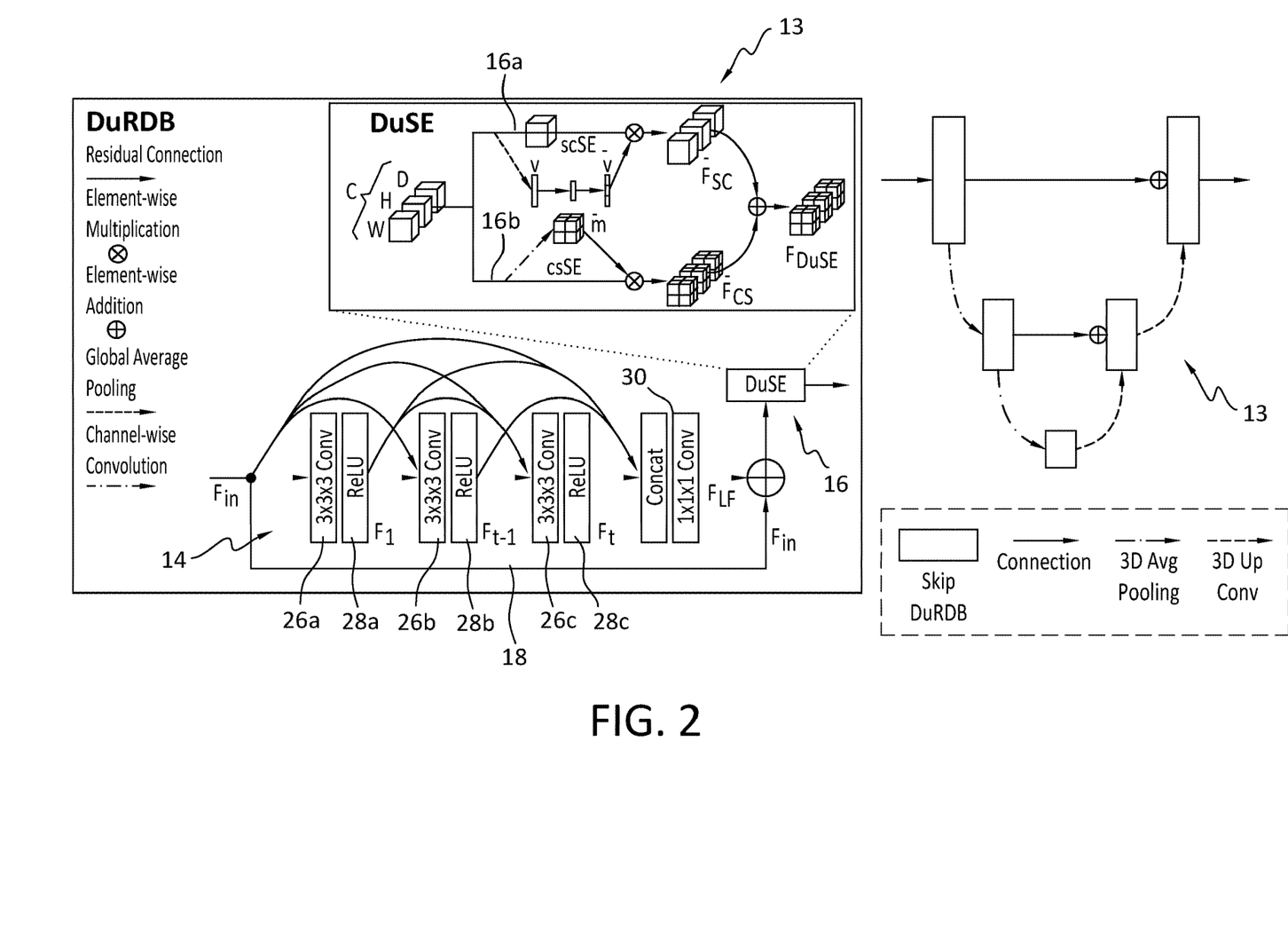
FIG. 2 is a network design of the present deep learning model—DuRDN (3D Dual Squeeze-and-Excitation Residual Dense Network) with DuRDBs (3D Dual Residual Dense Blocks). Each DuRDB consists of an RDB (Residual Dense Block) RDB and a DuSE (3D Dual Squeeze-and-Excitation Block). The designs of our DuRDB and DuSE are also illustrated.

Referring to FIG. 2, the overall framework of the 3D Dual Squeeze-and-Excitation Residual Dense Network 10 of the present invention is disclosed. The present method and system 100 apply the DuRDN 10 with 3D Dual Residual Dense Blocks (DuRDBs) 13, wherein each DuRDB consists of a Residual Dense Block (RDB) 14 and 3D Dual Squeeze-and-Excitation Block (DuSE) 16. The DuSE 16 of the present invention consists of two squeeze-and-excitation branches, including a spatial-squeeze-and-channel-excitation (scSE) 16*a* for re-calibrating feature channels and a channel-squeeze-and-spatial-excitation (csSE) 16*b* for recalibrating spatial features. The two branches calibrate features at two directions which are fused together to encourage feature maps to be more informative both channel-wise and spatially, thus, better encoding additional information in the input channels. The RDB 14 of the disclosed embodiment ensures that each convolutional layer in the RDB 14 has access to all the subsequent layers and passes on information that needs to be preserved, thus the DuRDN 10 can better learn useful patterns and reinforce the channel-wise encoding in addition to DuSE 16. As such, and as will be appreciated based upon the following disclosure, the RDB 14 includes multiple convolutional layers 26*a-c* with Rectified Linear Units (ReLU) 28*a-c*, as well as a local feature fusion (LFF) 30.

As will be appreciated based upon the following disclosure, the present method and system 100 incorporates both imaging and non-imaging data, such as patient BMI (body mass index), gender, and reconstructed images of the scatter window, which are all highly relevant to the level of attenuation effect as additional input for the DuRDN 10 employed in accordance with the present method and system 100. Extensive experiments on clinical cardiac SPECT datasets demonstrate that the DuRDN 10 of the present method and system 100 can efficiently encode additional physiological information and generate quality AC SPECT from NC SPECT for a range of patient sizes and different genders.

As briefly mentioned above, the DuRDN 10 consists of three major parts: a Residual Dense Block (RDB) 14, a Dual Squeeze-and-Excitation block (DuSE) 16 (wherein the RDB and DuSE make up the DuRDB), and U-Net backbone architecture 18 [Ronneberger, O., Fischer, P., Brox, T.: U-net: Convolutional networks for biomedical image segmentation. In: International Conference on Medical image computing and computer-assisted intervention, Springer (2015) 234-241] supported by the RDB 14 and DuSE 16.

Given the NC image volume ($V_{NC}$) reconstructed from the photopeak window projection data, the scattered image volume(s) ($V_{SC}$) reconstructed from the scatter window projection data, BMI and gender, the input of DuRDN can be formulated as $$I = \{V_{NC}, V_{SC}, V_{BMI}, V_{GD}\}$$

where { } is the concatenation operation along channels. $V_{BMI}$ is a constant volume with all voxel equals to BMI, and $V_{GD}$ is a binary volume indicating gender with male (1) and female (0). Denoting the DuRDN of the present invention as $\mathcal{P}(\cdot|\theta)$, the loss function used for training the network is $$\mathcal{L} = \|\mathcal{P}(I|\theta) - V_{AC}\|_1$$

where $V_{AC}$ is the ground truth AC image volume generated with CT-based attenuation correction. The RDB and DuSE details are discussed as follows.

The Residual Dense Block contains t densely connected convolution layers, local feature fusion, and local residual learning with details illustrated in the gray box of FIG. 2. In the RDB of the disclosed embodiment, the t-th convolution output can be formulated as:

$$F_t = \mathcal{H}_t\{F_{in}, F_1, \ldots, F_{t-1}\},$$

Where $\mathcal{H}$, denotes the t-th convolution followed by ReLU and { } means concatenation along featured channel. Then the method and system 100 of the present invention apply a local feature fusion (LFF), concatenation layer and a 1×1×1 convolution layer, to fuse the output from the input and all convolution layers. Thus, the LFF output can be expressed as:

$$F_{LF} = \mathcal{P}_{LFF}(\{F_{in}, F_1, F_2, \ldots, F_t\})$$

where $\mathcal{P}_{LFF}$ denotes the LFF operation. Finally, the system and method apply the local residual learning to LFF output by adding the residual connection from the RDB input, generating the RDB output:

$$F_{out} = F_{LF} + F_{in}$$

In a disclosed embodiment, the number of convolutions is set as t≤4 in the RDB.

The Dual Squeeze-and-Excitation Block (DuSE) contains two 3D Squeeze-and-Excitation branches for spatial-Squeeze-channel-Excitation (scSE) and channel-Squeeze-spatial-Excitation (csSE) [Hu, J., Shen, L., Sun, G.: Squeeze-and-excitation networks. In: Proceedings of the IEEE conference on computer vision and pattern recognition. (2018) 7132-7141; Roy, A. G., Navab, N., Wachinger, C.: Recalibrating fully convolutional networks with spatial and channel squeeze and excitation" blocks. IEEE transactions on medical imaging 38(2) (2018) 540-549], respectively. The framework is illustrated in the box labeled "DuSE" of FIG. 2.

For scSE, the input feature map is spatial-wise squeeze using global average pooling, where the feature map is formulated as $F = [f_1, f_2, \ldots, f_C]$ here with $f_n \in \mathbb{R}^{H \times W \times D}$ denoting the individual feature channel. The global average pooling output is flattened, generating $v \in \mathbb{R}^C$ with its z-th element:

$$v_z = \frac{1}{H \times W \times D} \sum_i^H \sum_j^W \sum_k^D f_z(i, j, k)$$

where vector v embeds the spatial-wise global information. Then, v is fed into two fully connected layers with weights of $\omega_1 \in$ $$\mathbb{R}^{\frac{C}{2} \times C}$$

and $\omega_2 \in$ $$\mathbb{R}^{C \times \frac{C}{2}},$$

producing the channel-wise calibration vector:

$$\hat{v} = \sigma(\omega_2 \eta(\omega_1 v))$$

where η and σ are the ReLU and Sigmoid activation function, respectively. The calibration vector is applied to the input feature map using channel-wise multiplication, namely channel-Excitation:

$$\hat{F}_{ac} = [f_1\hat{v}_1, f_2\hat{v}_2, \ldots, f_C\hat{v}_C]$$

where $\hat{v}_i$ indicates the importance of the i-th feature channel and lies in [0,1]. With scSE embedded into the network, the calibration vector adaptively learns to emphasize the important feature channels while down playing the others.

In csSE, the feature map is formulated as $F = [f^{1,1,1}, \ldots, f^{i,j,k}, \ldots, f^{H,W,D}]$, where $f^{i,j,k} \in \mathbb{R}^C$ indicates the feature at spatial location (i,j,k) with $i \in \{1, \ldots, H\}$, $j \in \{1, \ldots, W\}$ and $k \in \{1, \ldots, D\}$. The input feature map is channel-wise squeezed using a convolutional kernel with weights of $\omega_3 \in \mathbb{R}^{1 \times 1 \times 1 \times C \times 1}$, generating a volume tensor $m = \omega_3 \circledast F$ with $m \in \mathbb{R}^{H \times W \times D}$. Each $f_{i,j,k}$ is a linear combination of all feature channel at spatial location (i,j,k). Then, the spatial-wise calibration volume that lies in [0, 1] can be written as:

$$\hat{m} = \sigma(m) = \sigma(\omega_3 \circledast F)$$

where σ is the Sigmoid activation function. Applying the calibration volume to the input feature map, we have:

$$\hat{m} = \sigma(m) = \sigma(w_3 \circledast F)$$

where calibration parameter of $\hat{m}^{i,j,k}$ provides the relative importance of a spatial information of a given feature map. Similarly, with csSE embedded into the network, the calibration volume learns to stress the most important spatial locations while ignoring the irrelevant ones.

Finally, channel-wise calibration and spatial-wise calibration are combined via element-wise addition operation $F_{DusE} = \hat{F}_{sc} + \hat{F}_{cs}$. With the two SE branch fusion, feature at (i,j,k,c) possess high activation only when it receives high activation from both scSE and csSE. The present DuSE encourages the networks to recalibrate the feature map such that a more accurate and relevant feature map can be learned.

Evaluation with Human Dataset

The dataset for testing consisted of 176 anonymous clinical hybrid SPECT/CT myocardial perfusion studies scanned from Jan. 8, 2020 to Feb. 28, 2020, with pairs of AC, NC, SC stress-state images along with gender and BMI information. Each hybrid myocardial perfusion SPECT scan was acquired following the injection of $^{99m}$Tc-tetrofosmin on a GE Discovery NM/CT 570c SPECT/64-slice hybrid scanner. AC and NC image volumes were reconstructed from projection data using the photopeak window (133-148 keV), then corrected with and without CT attenuation map respectively. SC image volumes were respectively reconstructed from 3 scatter windows (55-80 keV, 80-105 keV, 105-130 keV) projection data without attenuation correction. All data were reconstructed into 70×70×50 volumes, and the central 32×32×32 ROI (Region of Interest) containing the left ventricle was cropped to reduce the effect from surrounding artifacts.

TABLE 1

The gender, height, weight and BMI distribution of the enrolled patients

| Dataset | | Height (m) | Weight (kg) | BMI |
|---|---|---|---|---|
| Training Dataset (63 Male, 45 Female) | Range | 1.45-1.93 | 49-127 | 19.21-44.04 |
| | Mean ± Std. | 1.69 ± 0.10 | 86.4 ± 17.7 | 30.09 ± 5.17 |
| Testing Dataset (34 Male, 24 Female) | Range | 1.32-1.98 | 42-134 | 17.48-44.44 |
| | Mean ± Std. | 1.67 ± 0.12 | 80.59 ± 23.69 | 29.65 ± 7.36 |

The dataset was divided into the training set including 108 patient studies and the testing set including 68 patient studies. Table 1 outlines the corresponding characteristics of the patients, including gender, BMI, height, and weight for the training set and the testing set, respectively. For quantitative evaluation, the results were evaluated using normalized mean square error (NMSE), normalized mean absolute error (NMAE), and peak signal-to-noise-ratio (PSNR) by comparing the synthetic AC volume with the ground truth AC volume. The method of the present invention was compared with a conventional existing method, 3D UNet, with various additional input combinations including scatter windows, BMI, and gender. For all models, the networks were trained for 1000 epochs with a batch size of 2. The Adam solver is used to optimize all the models with a momentum of 0.99 and a learning rate of $5 \times e^{-4}$. The network was implemented using PyTorch, an open source machine learning library based on the Torch library, used for applications such as computer vision and natural language processing. The training took about 5 hours on an NVIDIA GTX 1080 Ti GPU.

Figure 3:
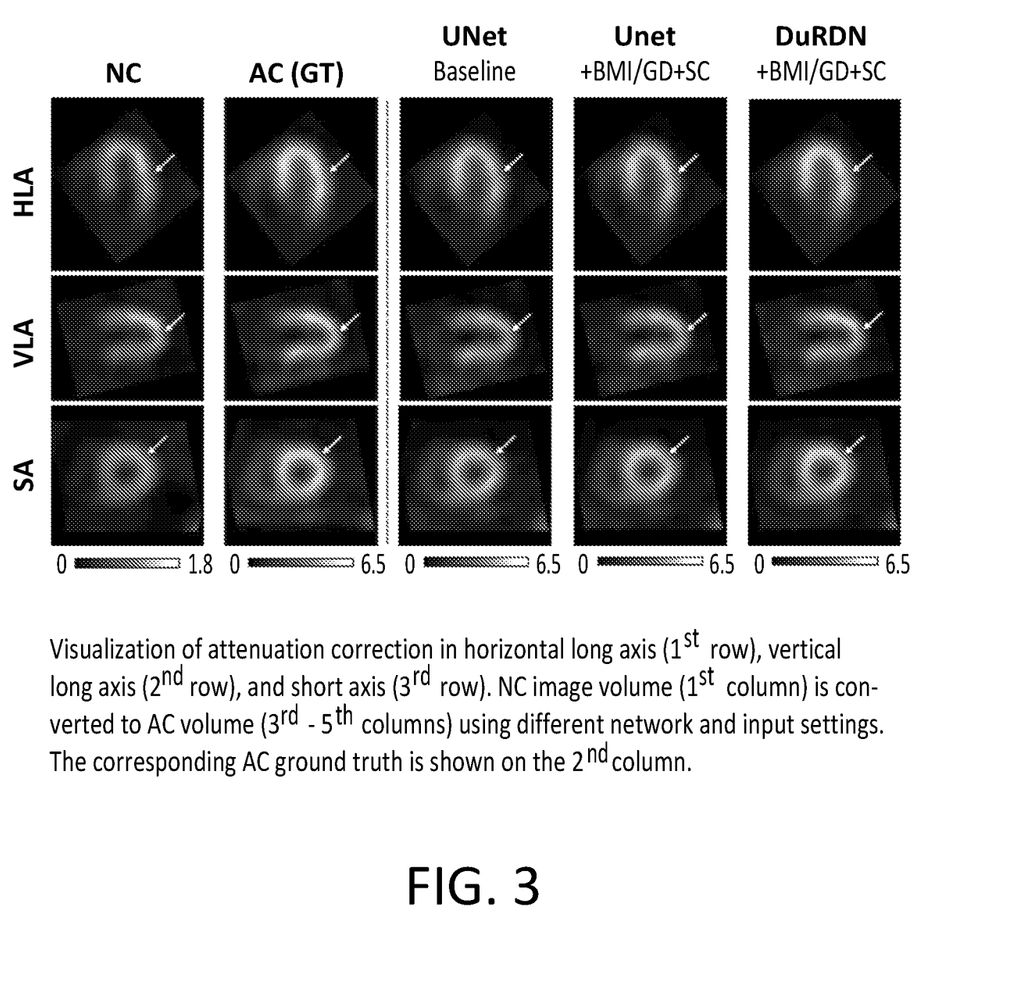
FIG. 3 is a visualization of direct attenuation correction of sample human subjects cardiac SPECT images in horizontal long axis (1st row), vertical long axis (2nd row), and short axis ($3^{rd}$ row) views. NC image volume (1st column) is converted to AC volume (3rd-5th columns) using different network and input settings. The corresponding AC ground truth is shown on the 2nd column.
Figure 4:
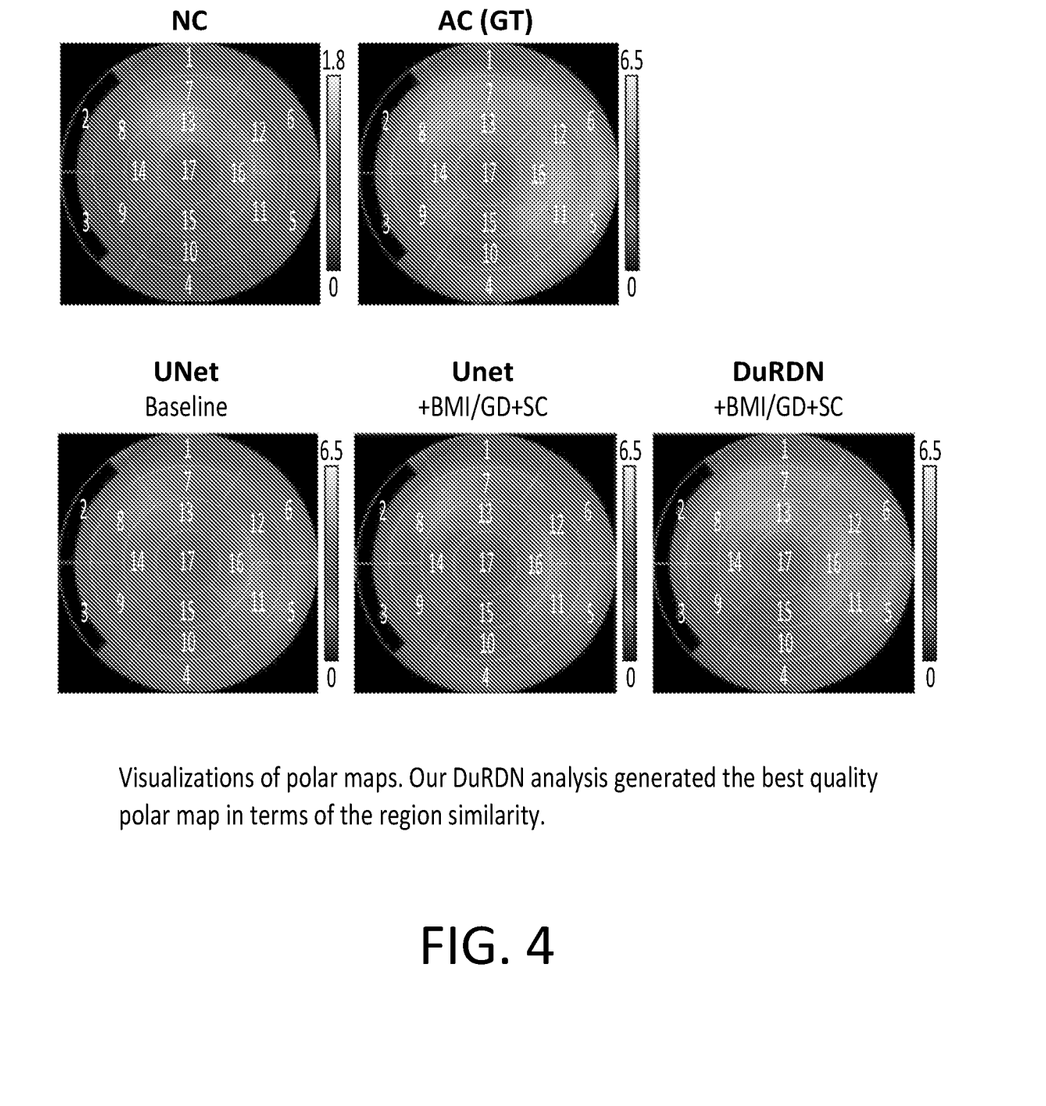
FIG. 4 shows visualizations of polar maps of direct attenuation correction. The DuRDN analysis generated the best quality polar map in terms of the region similarity.

Table 2 lists the quantitative results of the testing data. Results of different networks using different input settings are reported. Comparing the performance within each network, it was observed that using additional information into conventional 3D UNet as the input does not always improve the performance due to the non-ideal channel-wise encoding ability. In contrast, the present method and system 100 using the disclosed DuRDN 10 demonstrates superior performance from two aspects. First, the DuRDN baseline (only NC input) achieves better performance as compared to 3D UNet, demonstrating the efficient design of DuRDN for the attenuation correction task. Second, a progressive performance improvement was found as more information was added as the input, demonstrating that DuRDN can better encode the additional information provided in the input channels. Comparing the DuRDN+BMI&Gender and DuRDN+Scattering in Table 2, it was observed that the scatter window information is potentially more useful than BMI & gender information for the attenuation correction task, given that scattering provides voxel-wise scattering property that provides both spatial and attenuation-related information into the network. The qualitative comparison results of a sample subject are shown in FIGS. 3 and 4. The DuRDN with BMI, gender, and scattering information incorporated can generate high-quality AC volume that is highly consistent with the AC SPECT images using CT-based attenuation map.

TABLE 2

Quantitative comparison between UNet and our customized DuRDN
with different input information, using NMSE, NMAE, and PSNR.

| Mean ± Std. | NMSE (×10$^{-2}$) | NMAE (×10$^{-2}$) | PSNR |
|---|---|---|---|
| UNet Baseline | 2.25 ± 1.47 | 13.5 ± 3.51 | 28.94 ± 2.13 |
| UNet + BMI/GD | 2.30 ± 1.55 | 13.6 ± 3.55 | 28.85 ± 2.15 |
| UNet + SC | 2.23 ± 1.36 | 13.4 ± 3.40 | 28.95 ± 2.17 |
| UNet + BMI/GD + SC | 2.26 ± 1.55 | 13.4 ± 3.56 | 28.97 ± 2.18 |
| DuRDN Baseline | 2.07 ± 1.17 | 13.1 ± 3.07 | 29.20 ± 2.37 |
| DuRDN + BMI/GD | 2.06 ± 1.18 | 13.1 ± 3.06 | 29.22 ± 2.28 |
| DuRDN + SC | 2.01 ± 1.08 | 12.9 ± 2.99 | 29.31 ± 2.40 |
| DuRDN + BMI/GD + SC | 2.00 ± 1.12 | 12.8 ± 2.89 | 29.32 ± 2.28 |

Table 3 outlines the performance of the model of the present invention evaluated on various patient groups. In the application of SPECT attenuation correction, the larger size patients with greater radiotracer signal attenuation caused by soft-tissue could lead to more attenuation artifacts, and therefore be more difficult to correct. As observed from Table 3, the best attenuation correction result was obtained for patients with BMI <30, while analysis of female patients with BMI >30 led to the worst results, which could be due to the effect of breast attenuation. The DuRDN of the present invention with BMI, gender, and scattering information can efficiently reduce the attenuation correction error for female patients with BMI >30, while maintaining stable performance for other patients.

TABLE 3

Evaluation of model performance on different
gender and BMI range using NMSE and NMAE.

| NMSE | BMI < 30 | | BMI > 30 | |
|---|---|---|---|---|
| (×10$^{-2}$)/NMAE (×10$^{-2}$) | Male | Female | Male | Female |
| DuRDN Baseline | 1.94/12.6 | 1.97/12.8 | 1.97/12.9 | 2.09/13.5 |
| DuRDN + BMI/GD | 1.99/12.9 | 1.97/12.8 | 1.84/12.5 | 2.06/13.4 |
| DuRDN + SC | 1.93/12.5 | 1.91/12.7 | 1.86/12.5 | 2.06/13.3 |
| DuRDN + BMI/GD + SC | 1.87/12.3 | 1.86/12.4 | 1.88/12.8 | 2.10/13.5 |

The present CT-free attenuation correction method that is applicable to both general SPECT and dedicated cardiac SPECT systems with a limited field-of-view. Specifically, the information that is highly relevant to attenuation was incorporated to facilitate the learning of attenuation correction. Given the additional information as input, a 3D dual squeeze-and-excitation residual dense network was customized that can efficiently encode this channel-wise input information to improve the attenuation correction performance. A comprehensive evaluation of present approach using clinical hybrid SPECT/CT myocardial perfusion studies demonstrate that the present method and system can outperform traditional network designs by better incorporating input information of scatter window information, BMI and gender, thereby generating high-quality attenuation-corrected SPECT reconstructions without a CT attenuation scan.

It is appreciated that due to the small field-of-view (FOV) of dedicated cardiac SPECT, generating full FOV attenuation maps from small FOV SPECT images is challenging. The DuRDN embodiment described above with reference to FIGS. 1 and 2 addresses this issue by providing a direct approach for transforming a SPECT image without attenuation correction to a SPECT image with attenuation correction, without generating the attenuation maps.

As those skilled in the art will appreciate, and as discussed above, attenuation correction using CT transmission scanning enables accurate quantitative assessment of cardiac SPECT. While deep-learning-based indirect approaches are used to predict attenuation maps from emission data for rotational SPECT-only scanners with parallel-hole collimators and NaI crystals, it is appreciated direct methods, such as disclosed above, to generate AC images from NAC images might be easier to implement without the intermediate step of AC map generation, particularly useful for the small field-of-view of dedicated cardiac SPECT scanners with CZT detectors.

For example, a recent indirect approach has been developed to predict the µ-maps from emission images for parallel-hole SPECT [See, for example, Applicant's prior application PCT Application No. PCT/US2020/028672, which published as PCT Publication No. WO 2020/214911, entitled "METHOD AND SYSTEM FOR GENERATING ATTENUATION MAP FROM SPECT EMISSION DATA BASED UPON DEEP LEARNING AND ASSOCIATED ATTENUATION CORRECTION METHODS FOR SPECT IMAGING," ('911 Publication) and L. Shi, et al. "Deep learning-based attenuation map generation for myocardial perfusion SPECT," EJNMMI, pp. 1-13, 2020, both of which are incorporated herein by reference]. However, dedicated cardiac SPECT scanners can provide accurate reconstructions only in the central limited field-of-view (FOV) of about 19 cm in diameter, with inaccurate artifacts in the regions outside the FOV. It is challenging to generate full-FOV µ-maps required for the attenuation correction from limited-FOV SPECT images. Thus, the present direct approach has been explored to address this limitation [See, J. Yang, et al. "Direct Attenuation Correction Using Deep Learning for Cardiac SPECT: A Feasibility Study," JNM, 2021, which is incorporated herein by reference], which might over-corrected true myocardial perfusion defects in certain clinical cases.

With this in mind, the following presents a mechanism wherein the previously described DuRDN embodiment is used in the generation of truncated or full FOV attenuation maps from small FOV SPECT images using various reconstruction system matrix sizes.

Methods

1. Generation of Truncated Attenuation Map

Figure 5A:
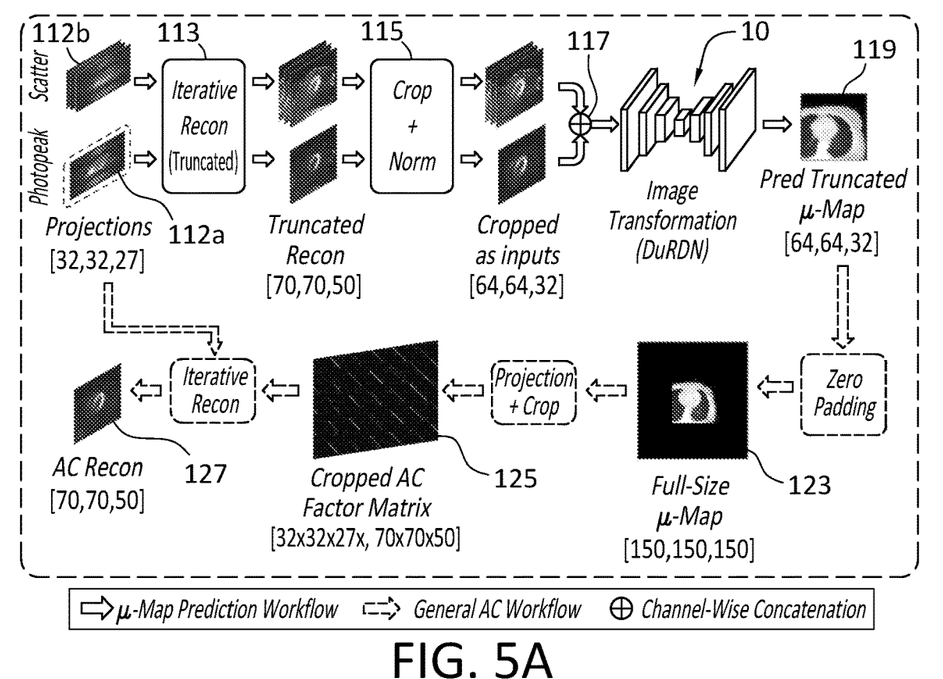
FIGS. 5A & 5B and 6A & 6B respectively show the workflows of truncated and full μ-map (also referred to herein as AC map or attenuation map) prediction and AC reconstruction.
Figure 6A:
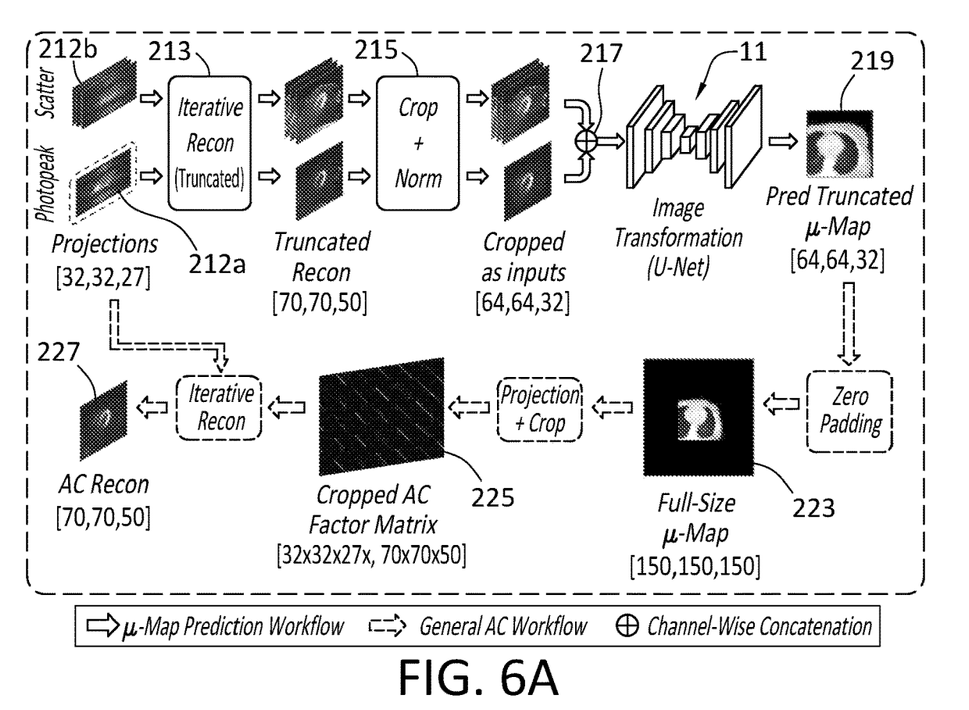

Referring to FIGS. 5A & 6A, the process of truncated attenuation map prediction and AC reconstruction is shown employing the neural networks 10, 11 described above as the DuRDN and described in Applicant's '911 Publication, respectively. In accordance with this embodiment, three scatter-window (55-80, 80-105, 105-130 keV) and one photopeak-window (133-148 keV) SPECT images 112*b*, 112*a*, 212*b*, 212*a* of truncated size (70×70×50 image matrix) were first reconstructed with projection data (32×32×27 image matrix) using iterative reconstructions (in particular, maximum likelihood estimation maximization (MLEM) algorithm, at 30 iterations) 113, 213. Due to the max-pooling layers of the neural networks 10, 11 described above as the DuRDN and described in Applicant's '911 Publication, respectively, the image size should be divisible by $2^L$ where L is the number of neural networks layers. Thus, the SPECT images were cropped (64×64×32 image matrix) and mean-normalized 115, 215, and then channel-wise concatenated 117, 217 as a multi-channel input to the neural networks 10, 11, that is, the DuRDN described above and the network described in Applicant's '911 Publication, respectively. The truncated attenuation map 119, 219 of the same size (64×64×32 image matrix) was then predicted. As the general attenuation correction (AC) workflow of GE Alcyone 570c scanner, the truncated attenuation map 119, 219 was zero-padded, that is, the attenuation map was extended with zeros in a conventional manner, into full size attenuation map (150×150×150 image matrix) 123, 223. The full-size attenuation map 123, 223 then went through a 3D projection process to generate a full-size AC system matrix (32×32×27×150×150×150), which was then cropped into a smaller size cropped AC system matrix (32×32×27×70×70×50) 125, 225 for the following AC SPECT reconstruction. Finally, the AC SPECT image (70×70×50, typically clinically used image matrix) 127, 227 was reconstructed with the projection data in the photopeak window 112a, 212a and the cropped AC system matrix 125, 225. The AC image was cropped to eliminate the background artifacts and mean-normalized for following quantitative evaluations.

2. Generation of Full Attenuation Map

Figure 5B:
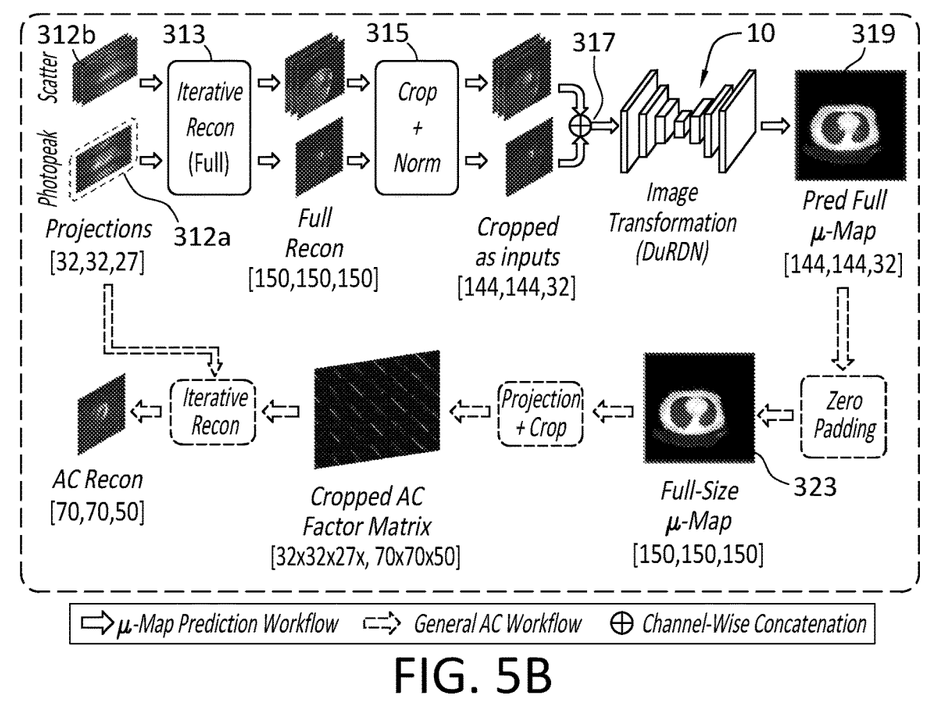
Figure 6B:
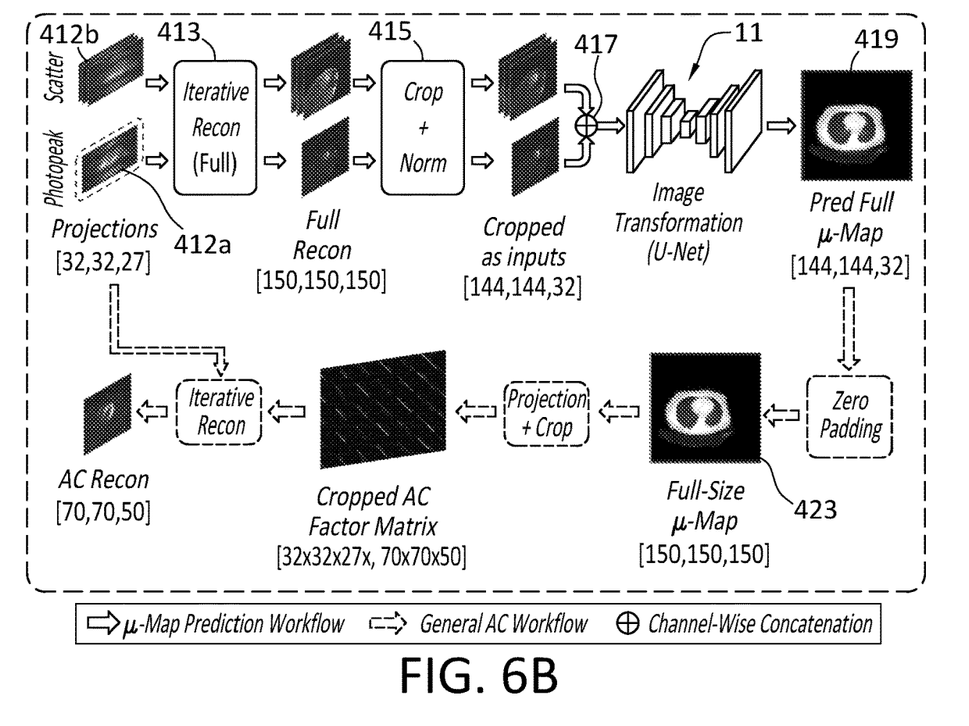

Referring to FIGS. 5B & 6B, similarly, full attenuation map prediction and AC reconstruction is shown employing the neural networks 10, 11 described above as the DuRDN and described in Applicant's '911 Publication, respectively. SPECT images 312a, 312b, 412a, 412b of full-size (150×150×150 image matrix) were first reconstructed 313, 413, cropped (144×144×32 image matrix), mean-normalized 315, 415, and channel-wise concatenated 317, 417 as a multi-channel input to the neural networks 10, 11, that is, the DuRDN described above and the network described in Applicant's '911 Publication, respectively. The full attenuation map 319, 419 of the same size was predicted and then zero-padded into the full size (150×150×150 image matrix) 323, 423 for AC SPECT image reconstruction. The general AC reconstruction workflow was same as the truncated attenuation map above.

Since the dedicated SPECT scanner has a small field-of-view (~19 cm in diameter), the truncated size reconstruction of emission data is expected to be accurate, while the regions outside of 19-cm field-of-view (FOV) is not accurately reconstructable. That being said, the deep learning model, that is, the DuRDN 10 described above, was robust enough to generate accurate full FOV attenuation maps from SPECT emission data acquired from a small FOV scanner.

Results

Truncated and Full μ-Map Prediction

Figure 7:
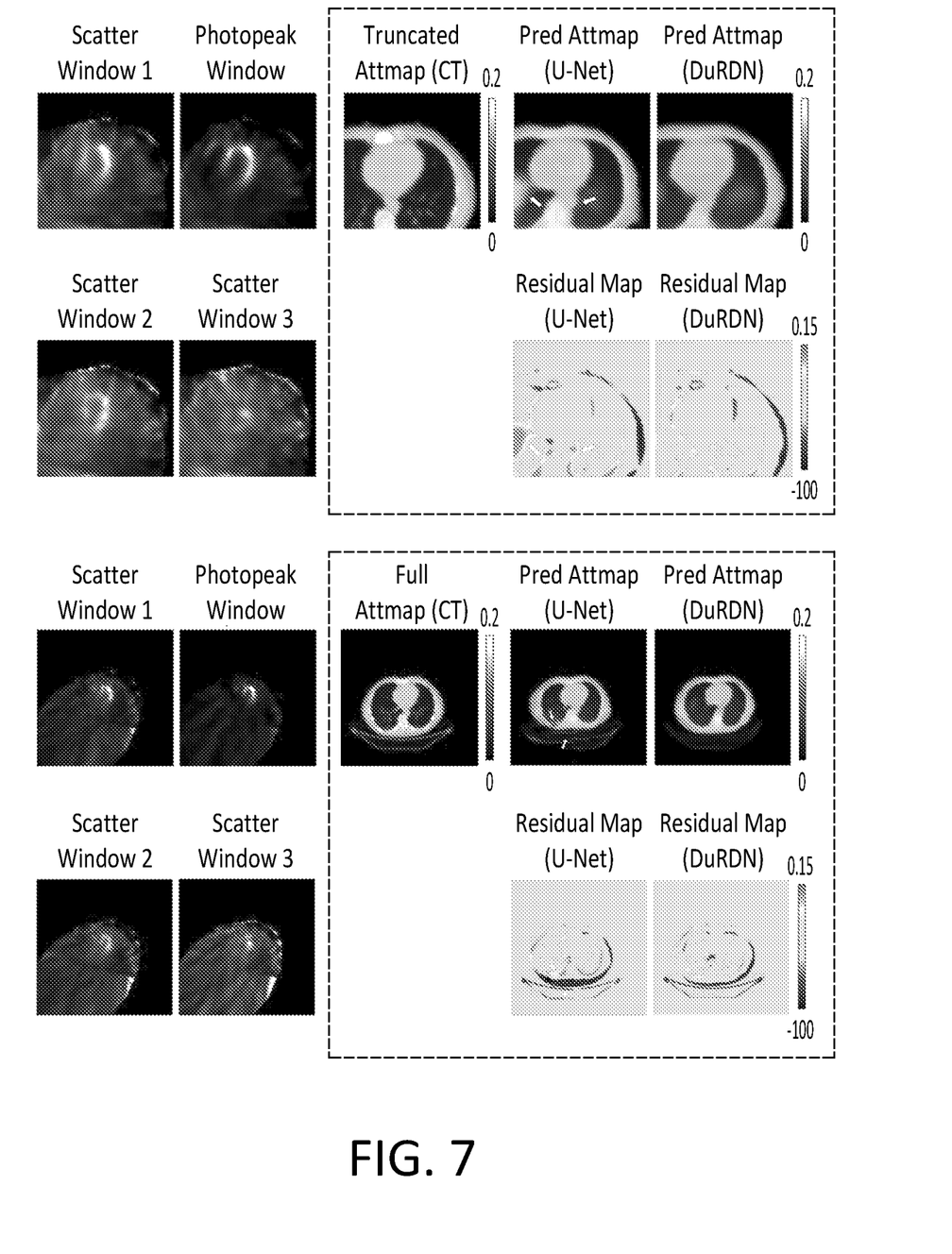
FIG. 7 shows SPECT images from different energy windows and the predicted μ-maps. Truncated images were listed on the top and full images were listed at the bottom. DuRDN showed higher accuracy than U-Net in both truncated and full μ-map predictions. Predicted artifacts were denoted by the white arrows. Residual maps were listed under the predicted μ-maps.

FIG. 7 showed the predicted truncated and full μ-maps by U-Net as described in Applicant's '911 Publication and DuRDN as described above with reference to FIGS. 1 and 2. In truncated μ-map prediction, U-Net as described in Applicant's '911 Publication and DuRDN as described above with reference to FIGS. 1 and 2 showed comparable accuracy, and U-Net as described in Applicant's '911 Publication generated artifacts at the inner organ boundaries. In the full μ-map prediction, U-Net as described in Applicant's '911 Publication generated apparent artifacts due to the inaccurate SPECT reconstruction at the bottom left zone. In this condition, DuRDN as described above with reference to FIGS. 1 and 2 showed higher prediction accuracy than U-Net as described in Applicant's '911 Publication. Table 4 shows the quantitative evaluation of the predicted truncated and full μ-maps in terms of normalized mean squared error (NMSE), normalized mean absolute error (NMAE), and peak signal to noise ratio (PSNR). DuRDN as described above with reference to FIGS. 1 and 2 showed better performance in both truncated and full μ-map predictions.

TABLE 4

Voxel-Wise Quantitative Evaluations of Predicted Truncated and Full μ-Maps for Dedicated SPECT. The Best-Performing Groups are BOLD.

| | Predicted Truncated μ-Maps | | | Predicted Full μ-Maps | | |
|---|---|---|---|---|---|---|
| | NMSE % | NMAE % | PSNR | NMSE % | NMAE % | PSNR |
| U-Net (EM) | 11.52 ± 4.91 | 21.24 ± 6.24 | 17.16 ± 17.5 | 20.76 ± 7.49 | 35.22 ± 9.41 | 19.00 ± 1.69 |
| U-Net (SC) | 10.95 ± 4.55 | 20.70 ± 5.77 | 17.38 ± 1.73 | 20.86 ± 7.30 | 37.29 ± 9.98 | 18.96 ± 151 |
| U-Net (EM + SC) | 10.46 ± 4.47 | 19.87 ± 5.69 | 17.58 ± 1.77 | 19.40 ± 6.34 | 33.15 ± 7.99 | 19.26 ± 1.62 |
| DuRDN (EM) | 10.57 ± 4.56 | 20.31 ± 5.94 | 17.54 ± 1.78 | 19.43 ± 7.05 | 31.81 ± 8.23 | 19.30 ± 1.90 |
| DuRDN (SC) | 10.31 ± 4.49 | 20.41 ± 5.90 | 17.64 ± 1.71 | 19.69 ± 5.85 | 32.30 ± 6.95 | 19.18 ± 1.72 |
| DuRDN (EM + SC) | 9.86 ± 3.78 | 20.04 ± 5.05 | 17.78 ± 1.76 | 17.91 ± 5.66 | 30.45 ± 6.85 | 19.62 ± 1.70 |

TABLE 5

Voxel-Wise Quantitative Evaluations of AC Images Predicted by Direct Transformation, Corrected by Truncated and Full μ-Maps for Dedicated SPECT. Both photopeak and scatter windows were input. The Best-Performing Group is BOLD.

| | NMSE % | NMAE % | SSIM | PSNR |
|---|---|---|---|---|
| NAC Baseline | 10.86 ± 3.36 | 30.54 ± 4.10 | 0.785 ± 0.032 | 28.45 ± 2.01 |
| Direct: U-Net | 2.36 ± 1.23 | 14.10 ± 2.81 | 0.903 ± 0.026 | 35.35 ± 2.11 |
| Direct: DuRDN | 2.21 ± 1.17 | 13.57 ± 2.76 | 0.916 ± 0.024 | 35.68 ± 2.30 |
| Truncated μ-Maps Recon: U-Net | 1.73 ± 0.84 | 11.87 ± 2.41 | 0.935 ± 0.021 | 36.70 ± 2.24 |
| Truncated μ-Maps Recon: DuRDN | 1.69 ± 0.82 | 11.65 ± 2.40 | 0.938 ± 0.021 | 36.77 ± 2.27 |
| Full μ-Maps Recon: U-Net | 1.25 ± 0.73 | 9.80 ± 2.53 | 0.947 ± 0.020 | 38.28 ± 2.41 |
| Full μ-Maps Recon: DuRDN | 1.20 ± 0.72 | 9.68 ± 2.50 | 0.948 ± 0.019 | 38.46 ± 2.34 |

SPECT AC Images by Both Direct and Indirect Approaches

Figure 8:
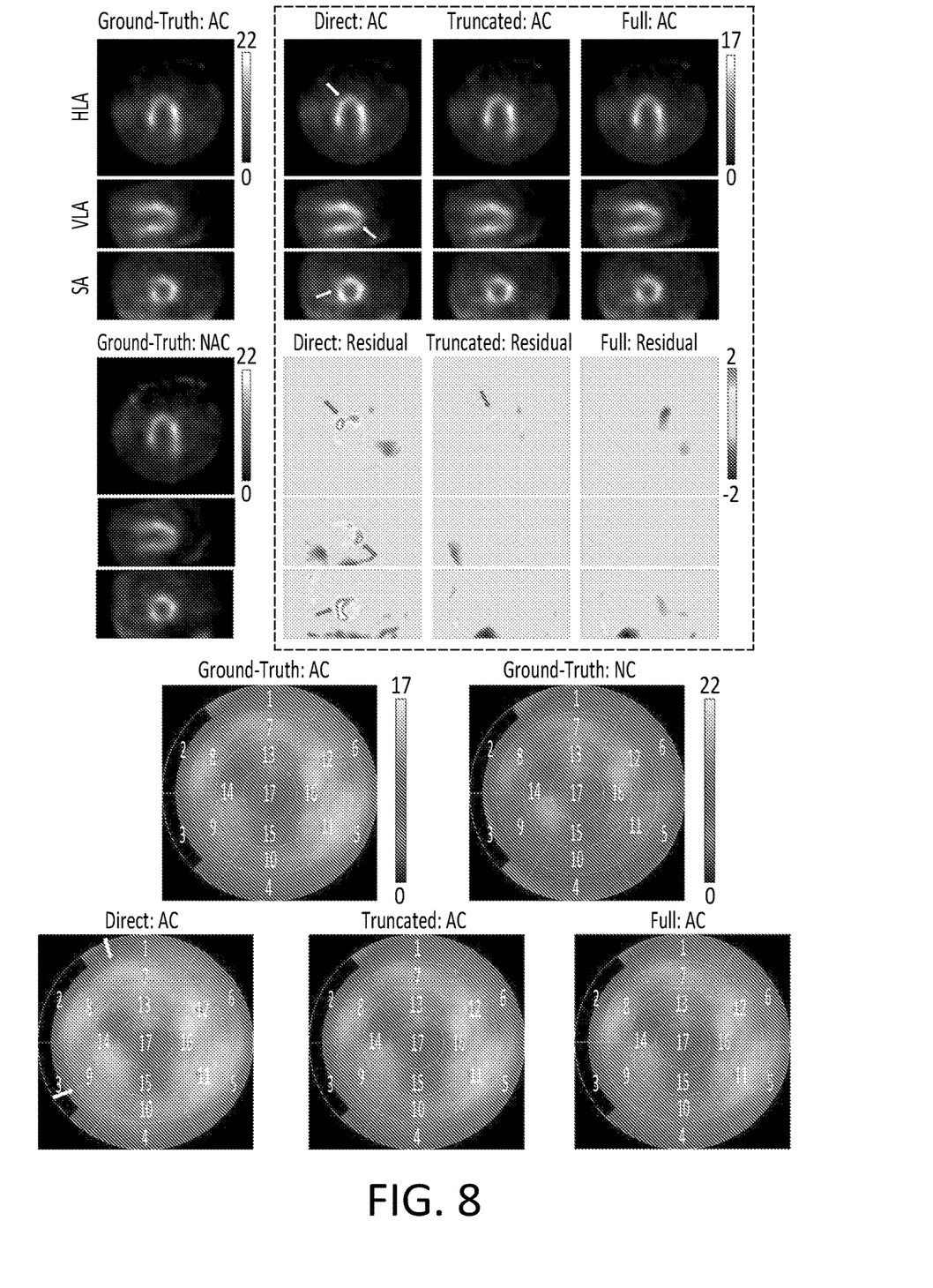
FIG. 8 shows SPECT AC images by direct transformation, truncated μ-map, and full μ-map. Residual maps were listed under each reconstructed AC image. 17-segment polarmaps were listed at the bottom. Reconstructed by truncated and full μ-map showed higher image reconstruction accuracy than direct transformation, which overcorrected the image intensity at the apex denoted by the white arrows.

FIG. 8 showed the SPECT AC images predicted by direct transformation, and corrected by truncated and full μ-map. In this case, the SPECT AC image by direct transformation over-corrected the image myocardial perfusion intensity at the apex, and then over-corrected the true defects there. In contrast, SPECT AC images corrected by truncated and full µ-map showed more consistent image intensity. Table 5 showed the voxel-wise quantitative evaluations of AC images predicted by direct transformation, corrected by truncated and full µ-maps. Images corrected by truncated and full µ-maps showed superior performance than direct transformation. Images by full µ-map using DuRDN showed the best performance.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A system based upon artificial neural networks to directly generate attenuation-corrected SPECT from non-attenuation-corrected SPECT (single photon emission computed tomography) without any intermediate step of attenuation map estimation, comprising:
   a SPECT scanner for dynamic SPECT imaging;
   a machine learning system including a 3D Dual Squeeze-and-Excitation Residual Dense Network for directly generating attenuation-corrected SPECT from non-attenuation-corrected SPECT without any intermediate step of attenuation map estimation, wherein the machine learning system reconstructs images from a photopeak window image of the SPECT scanner, and the reconstructed images are fed to the 3D Dual Squeeze-and-Excitation Residual Dense Network to generate attenuation-corrected SPECT.

2. The system according to claim 1, wherein 126 keV-155 keV is used for the photopeak window.

3. A system based upon artificial neural networks to directly generate attenuation-corrected SPECT from non-attenuation-corrected SPECT (single photon emission computed tomography) without any intermediate step of attenuation map estimation, comprising:
   a SPECT scanner for dynamic SPECT imaging;
   a machine learning system including a 3D Dual Squeeze-and-Excitation Residual Dense Network for directly generating attenuation-corrected SPECT from non-attenuation-corrected SPECT without any intermediate step of attenuation map estimation, wherein the machine learning system reconstructs images from a photopeak window image and one or more scatter window images of the SPECT scanner, and the reconstructed images are fed to the 3D Dual Squeeze-and-Excitation Residual Dense Network to generate attenuation-corrected SPECT;
   wherein 126 keV-155 keV is used for the photopeak window and 55-80 keV, 80-105 keV, and 105-130 keV are used for the scatter windows.

4. The system according to claim 1, wherein the 3D Dual Squeeze-and-Excitation Residual Dense Network includes 3D Dual Residual Dense Blocks.

5. The system according to claim 1, wherein the 3D Dual Squeeze-and-Excitation Residual Dense Network consists of a Residual Dense Block, a Dual Squeeze-and-Excitation block, and a U-Net backbone architecture supported by the Residual Dense Block and the 3D Dual Squeeze-and-Excitation Block.

6. A method based upon artificial neural networks to directly generate attenuation-corrected SPECT from non-attenuation-corrected SPECT (single photon emission computed tomography) without any intermediate step of attenuation map estimation, comprising:
   generating images from a photopeak window and one or more scatter windows of a SPECT scanner;
   applying a machine learning system including a 3D Dual Squeeze-and-Excitation Residual Dense Network for directly generating attenuation-corrected SPECT from non-attenuation-corrected SPECT without any intermediate step of attenuation map estimation, wherein the machine learning system reconstructs the images from the photopeak window image of the SPECT scanner, and the reconstructed images are to generate attenuation-corrected SPECT.

7. The method according to claim 6, wherein 126 keV-155 keV is used for the photopeak window.

8. A method based upon artificial neural networks to directly generate attenuation-corrected SPECT from non-attenuation-corrected SPECT (single photon emission computed tomography) without any intermediate step of attenuation map estimation, comprising:
   generating images from a photopeak window and one or more scatter windows of a SPECT scanner;
   applying a machine learning system including a 3D Dual Squeeze-and-Excitation Residual Dense Network for directly generating attenuation-corrected SPECT from non-attenuation-corrected SPECT without any intermediate step of attenuation map estimation, wherein the machine learning system reconstructs the images from the photopeak window image and the one or more scatter window images of the SPECT scanner, and the reconstructed images are used to generate attenuation-corrected SPECT;
   wherein 126 keV-155 keV is used for the photopeak window and 55-80 keV, 80-105 keV, and 105-130 keV are used for the scatter windows.

9. The method according to claim 6, wherein the 3D Dual Squeeze-and-Excitation Residual Dense Network includes 3D Dual Residual Dense Blocks.

10. The method according to claim 6, wherein the 3D Dual Squeeze-and-Excitation Residual Dense Network consists of a Residual Dense Block, a Dual Squeeze-and-Excitation block, and a U-Net backbone architecture supported by the Residual Dense Block and 3D Dual Squeeze-and-Excitation Block.

11. The method according to claim 6, wherein the machine learning system reconstructs the images from the photopeak window image and the one or more scatter windows of a dedicated cardiac SPECT scanner having a small field of view of 19 cm in diameter, and further including the step of estimating truncated or full attenuation maps from SPECT reconstructions in the photopeak window and the one or more scatter windows of the SPECT scanners.

12. A system based upon artificial neural networks to generate attenuation-corrected SPECT from non-attenuation-corrected SPECT (single photon emission computed tomography) with an intermediate step of attenuation map estimation, comprising:
   a SPECT scanner for dynamic SPECT imaging;
   a machine learning system including a 3D Dual Squeeze-and-Excitation Residual Dense Network for generating attenuation maps from non-attenuation-corrected SPECT, wherein the machine learning system reconstructs images from a photopeak window image of the SPECT scanner, and the reconstructed images are fed to the 3D Dual Squeeze-and-Excitation Residual Dense Network to generate an attenuation map.

13. The system according to claim 12, wherein 126 keV-155 keV is used for the photopeak window.

14. A system based upon artificial neural networks to generate attenuation-corrected SPECT from non-attenuation-corrected SPECT (single photon emission computed tomography) with an intermediate step of attenuation map estimation, comprising:
- a SPECT scanner for dynamic SPECT imaging;
- a machine learning system including a 3D Dual Squeeze-and-Excitation Residual Dense Network for generating attenuation maps from non-attenuation-corrected SPECT, wherein the machine learning system reconstructs images from a photopeak window and one or more scatter windows of the SPECT scanner, and the reconstructed images are fed to the 3D Dual Squeeze-and-Excitation Residual Dense Network to generate attenuation-corrected SPECT;
- wherein 126 keV-155 keV is used for the photopeak window and 55-80 keV, 80-105 keV, and 105-130 keV are used for the scatter windows.

15. The system according to claim 12, wherein the 3D Dual Squeeze-and-Excitation Residual Dense Network includes 3D Dual Residual Dense Blocks.

16. The system according to claim 12, wherein the 3D Dual Squeeze-and-Excitation Residual Dense Network consists of a Residual Dense Block, a Dual Squeeze-and-Excitation block, and a U-Net backbone architecture supported by the Residual Dense Block and the 3D Dual Squeeze-and-Excitation Block.

17. A method based upon artificial neural networks to generate attenuation-corrected SPECT from non-attenuation-corrected SPECT (single photon emission computed tomography) with an intermediate step of attenuation map estimation, comprising:
- generating images from a photopeak window and one or more scatter windows of a SPECT scanner;
- applying a machine learning system including a 3D Dual Squeeze-and-Excitation Residual Dense Network for generating attenuation maps from non-attenuation-corrected SPECT, wherein the machine learning system reconstructs the images from the photopeak window image, and the reconstructed images are used to generate attenuation-corrected SPECT.

18. The method according to claim 17, wherein 126 keV-155 keV is used for the photopeak window.

19. A method based upon artificial neural networks to generate attenuation-corrected SPECT from non-attenuation-corrected SPECT (single photon emission computed tomography) with an intermediate step of attenuation map estimation, comprising:
- generating images from a photopeak window and one or more scatter windows of a SPECT scanner;
- applying a machine learning system including a 3D Dual Squeeze-and-Excitation Residual Dense Network for generating attenuation maps from non-attenuation-corrected SPECT, wherein the machine learning system reconstructs the images from the photopeak window image and the one or more scatter window images of the SPECT scanner, and the reconstructed images are used to generate attenuation-corrected SPECT;
- wherein 126 keV-155 keV is used for the photopeak window and 55-80 keV, 80-105 keV, and 105-130 keV are used for the scatter windows.

20. The method according to claim 17, wherein the 3D Dual Squeeze-and-Excitation Residual Dense Network includes 3D Dual Residual Dense Blocks.

21. The method according to claim 17, wherein the 3D Dual Squeeze-and-Excitation Residual Dense Network consists of a Residual Dense Block, a Dual Squeeze-and-Excitation block, and a U-Net backbone architecture supported by the Residual Dense Block and 3D Dual Squeeze-and-Excitation Block.

22. The method according to claim 17, wherein the machine learning system reconstructs the images from the photopeak window image and the one or more scatter windows of a dedicated cardiac SPECT scanner having a small field of view of 19 cm in diameter, and further including the step of estimating truncated or full attenuation maps from SPECT reconstructions in the photopeak window and the one or more scatter windows of the SPECT scanners.

* * * * *